[11] 4,408,294
[45] Oct. 4, 1983

[54] METHOD FOR ON-LINE DETECTION OF INCIPIENT CRACKS IN TURBINE-GENERATOR ROTORS

[75] Inventor: Imdad Imam, Schenectady, N.Y.

[73] Assignee: General Electric Company, Schenectady, N.Y.

[21] Appl. No.: 248,571

[22] Filed: Mar. 27, 1981

[51] Int. Cl.³ .............................................. G01M 7/00
[52] U.S. Cl. ...................................... 364/508; 73/577; 364/507; 364/552
[58] Field of Search .................. 364/507, 552, 508; 73/577, 579, 598, 600, 602, 799

[56] References Cited

U.S. PATENT DOCUMENTS

| | | | |
|---|---|---|---|
| 3,292,425 | 9/1963 | Conn | 73/67 |
| 3,315,522 | 10/1962 | Frarey et al. | 73/116 |
| 3,705,516 | 12/1972 | Reis | 73/71.4 |
| 4,184,205 | 1/1980 | Morrow | 73/577 |
| 4,213,346 | 7/1980 | Polovnikov et al. | 73/660 |
| 4,229,796 | 10/1980 | Garrett | 364/507 |
| 4,274,288 | 6/1981 | Tittman et al. | 364/507 |
| 4,283,956 | 8/1981 | Lechner et al. | 73/577 |

OTHER PUBLICATIONS

"Applications of Spectrum Analysis to Onstream Condition Monitoring and Malfunction Diagnosis of Process Machinery", by J. E. Borhaug & J. S. Mitchell, (19) Proceedings of the 1st Turbo-machinery Symposium, Gas Turbine Laboratories, Texas A & M University.
"Vibration Signature Analysis as a Means of On-Line Non-Destructive Examination of Turbine Generators", (Oct. 1980).
Couchman et al., "Computerized Signal Processing for Detecting Cracks Under Installed Fasteners", Ultrasonics; vol. 14, No. 6; Nov. 1976.
Fujimoto et al., "Crack Propagation Testing Machine using Shimadzu Servopulser Dynatec", Shimadzu Rev. (Japan); 6/11/79.
Grabowski, "The Vibrational Behavior of a Turbine Rotor Containing a Transverse Crack", Trans. of ASME, vol. 102, p. 140, Jan. 1980.
Conference on Vibrations in Rotating Machinery; I Mech. E. Sep. 15-17, 1976, Paper Nos. C168/76 (Mayes et al.); C178/76 (Gasch); C162/76 (Henry et al.).

Primary Examiner—Errol A. Krass
Attorney, Agent, or Firm—Robert C. Kain, Jr.; John F. Ahern

[57] ABSTRACT

A method is disclosed for detecting incipient cracks in the rotor of a turbine-generator while the turbine-generator is on-line operating under normal conditions. Vibration signature analysis is performed on a set of difference signals produced by superposing and subtracting corresponding enhanced background and foreground vibration signals. Each enhanced vibration signal is created by superposing and summing an integral number of vibration signal segments, each segment corresponding to one revolution of the rotor. An incipient crack is manifested principally by the appearance and increase in relative amplitude of signal harmonics at twice the rotational speed of the rotor. The method of the invention is sufficiently sensitive to detect cracks having a depth on the order of less than one-percent the diameter of the rotor.

7 Claims, 5 Drawing Figures

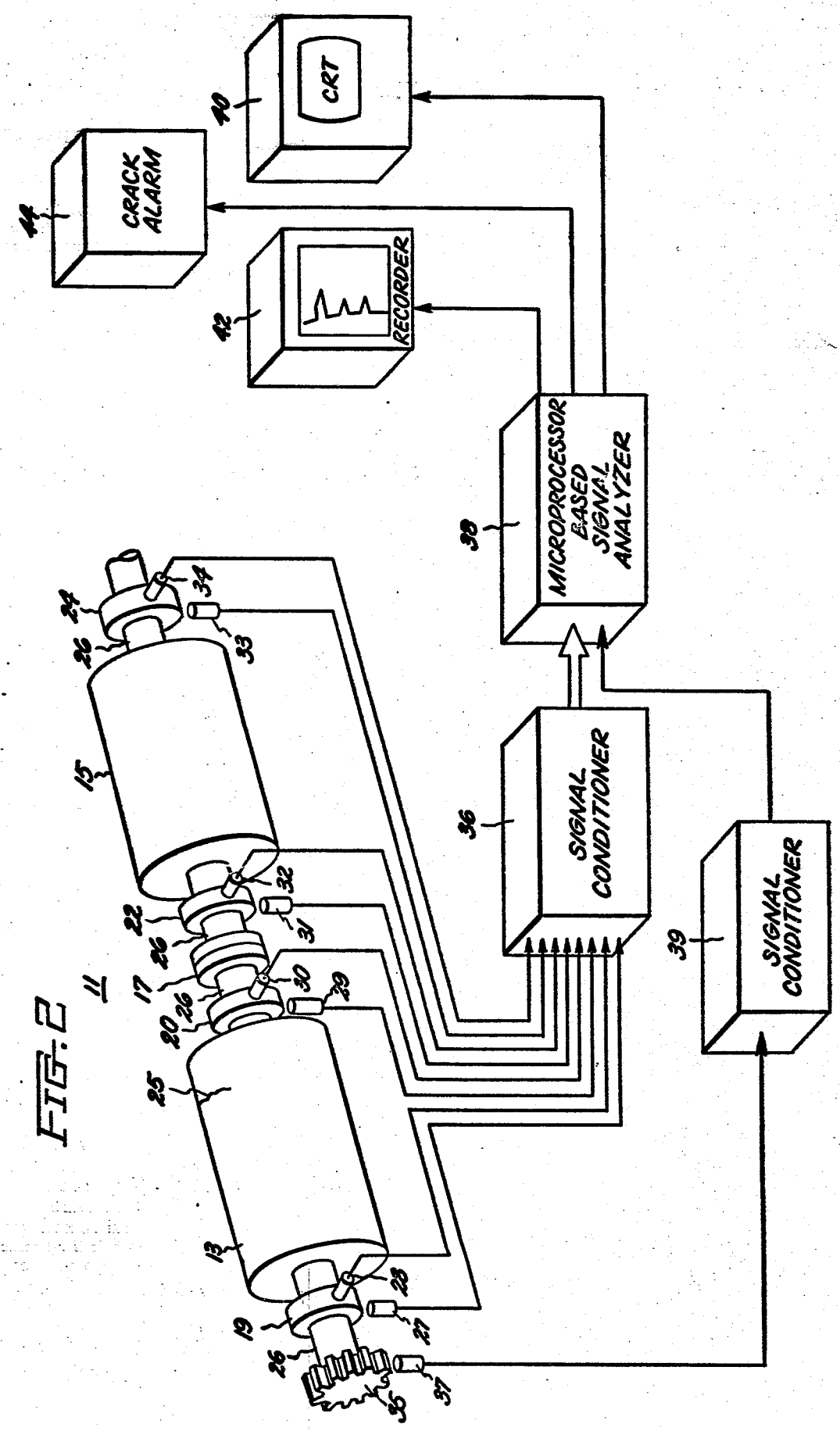

METHOD FOR ON-LINE DETECTION OF INCIPIENT CRACKS IN TURBINE-GENERATOR ROTORS

BACKGROUND OF THE INVENTION

This invention relates generally to the detection of cracks in the rotor of a turbine-generator set and in particular to a method for the detection of incipient rotor cracks while the turbine-generator is on-line under normal load.

The rotor of a turbine-generator (for example, the rotor of a large steam driven turbine-generator set of the type used in the commercial generation of electrical power) is frequently subjected to severe mechanical and thermal stresses due to any number of fairly routine operating conditions. Among these are such things as changes in load and operating temperature. While the rotors of these machines have an excellent record of safety and reliability, and are designed to withstand these stressful conditions, cracks have developed under some circumstances in some rotors following years of service. The development and growth of a crack is by no means predictable, however, and in some extreme cases rotors have actually burst in a brittle fracture mode.

Obviously, a cracked rotor must be replaced or repaired to protect equipment and personnel and to insure continued efficient operation. If a crack is discovered soon enough, while it is small, the rotor may be economically repaired and returned to service in a relatively short period of time. On the other hand, if the crack has grown to the point that the rotor must be replaced, there is not only the high cost of replacement but there is a potentially greater cost resulting from the loss of power generating capacity. Thus, there has been a continual search in the art for improved methods and apparatus by which an incipient crack can readily be detected in the rotor of a turbine-generator so that corrective action can be quickly taken.

A number of techniques are known in the art and used to detect the presence and growth of a rotor crack. These include (1) surface inspection methods such as magnetic particle testing, eddy current testing, and dye penetrant techniques; and (2) volumetric methods such as ultrasonic testing (audiography). Unfortunately, none of these techniques is suitable for inspection while the machine is on-line running under load. With only these techniques available, operating personnel have tried to insure themselves against a major loss by scheduling periodic outages during which the turbine-generator is inspected and tested by such techniques. While these periodic inspections provide an assessment of the condition of a rotor as it is at the time the investigation is performed, there is always the risk that a crack might initiate and grow between inspections.

Another known technique, based on vibration signature analysis, has also been used for rotor crack detection and has offered some relief from the need to bring the machine to a complete stop. Until recently this technique has been useful only by taking the machine off line and then decelerating it to nearly zero speed to determine if a crack is present. In a copending application, Ser. No. 236,007 which is of common assignee with the present invention, an on-line signal analysis method of crack detection is disclosed which eliminates the need to decelerate the machine. Indeed, with the method of the aforementioned application, the integrity of the rotor may be determined while the turbine-generator is operating at normal speed and supplying power to a load. However, even with this recently developed on-line signature analysis method, there is a need to transitorily perturb the rotor so that any crack present will manifest itself by producing a new and different vibration response mode. Thus, while the rotor perturbation and subsequent signature analysis of the vibration signal allows detection of incipient cracks on-line, it is generally desirable to avoid such perturbations since there is the potential (if the method is misused) for imposing harmful mechanical or thermal stress on the rotor. Furthermore, since the method is based on a transient response, it does not lend itself to continuous, unattended monitoring.

Accordingly, it is among the objectives of the present invention to provide a rotor crack detection method which is useful for detecting incipient rotor cracks while the turbine-generator is on-line operating under normal load, which is more sensitive than previous methods, and which avoids the need to impose transient, physical perturbations on the rotor.

Another objective of the invention is to provide a method for on-line continuous monitoring of a turbine-generator for early detection of cracks in the rotor.

Still further objectives and advantages will be apparent from the ensuing description of the invention, its principles, and its operation.

SUMMARY OF THE INVENTION

In a preferred form of the invention, mechanical vibrations of the rotor are sensed by a plurality of vibration sensors to provide one or more time-dependent vibration signals. An enhanced background vibration signal, representative of the vibratory response of the rotor prior to the formation of a crack is then obtained from each vibration signal. The enhanced background signals are formed by dividing each vibration signal into time segments in which each segment corresponds to one revolution of the rotor and by then summing a large integral number of such segments by superposition. The summed segments comprising a particular enhanced signal are taken from the same vibration signal. The summed results are referred to as enhanced signals since the repetitive vibration information content of each signal is magnified, but the random, spurious noise content of each signal is effectively integrated out. Each enhanced background vibration signal is retained by the monitoring instrumentation for recall to serve as an indication of the normal, non-crack vibration response of the rotor and each is therefore available for essentially continuous comparison with a corresponding enhanced foreground vibration signal which is substantially in real-time.

The enhanced foreground vibration signals are provided substantially in the same manner as are the enhanced background vibration signals with the exception that they are continuously being formed in essentially real-time as the turbine-generator is in operation. Thus, to form the enhanced foreground signals each vibration signal is broken into time segments in which each corresponds to one rotor revolution. A large integral number of time segments (equal to the number used for creating the enhanced background vibration signal) is continuously summed to magnify the information content of each vibration signal and to remove noise. Then, on a continuous basis, the enhanced background signals are subtracted from the corresponding enhanced foreground vibration signals by superposition to provide difference signals-one for each input vibration signal. Subsequently, signature analysis (spectrum analysis) is performed on each difference signal to determine its spectral content. An incipient crack in the rotor is manifested principally by the appearance and increase in relative amplitude of harmonics at twice the rotational speed of the rotor.

The method of the invention is sufficiently sensitive to detect cracks having a depth on the order of less than one percent the diameter of the rotor.

BRIEF DESCRIPTION OF THE DRAWINGS

While the specification concludes with claims particularly pointing out and distinctly claiming the subject matter regarded as the invention, the invention will be better understood from the following description taken in connection with the accompanying drawings in which:

FIG. 2 is a simplified schematic illustration of a tandemly coupled turbine-generator rotor and of apparatus for carrying out the invention;

DETAILED DESCRIPTION OF THE INVENTION

Figure 1:
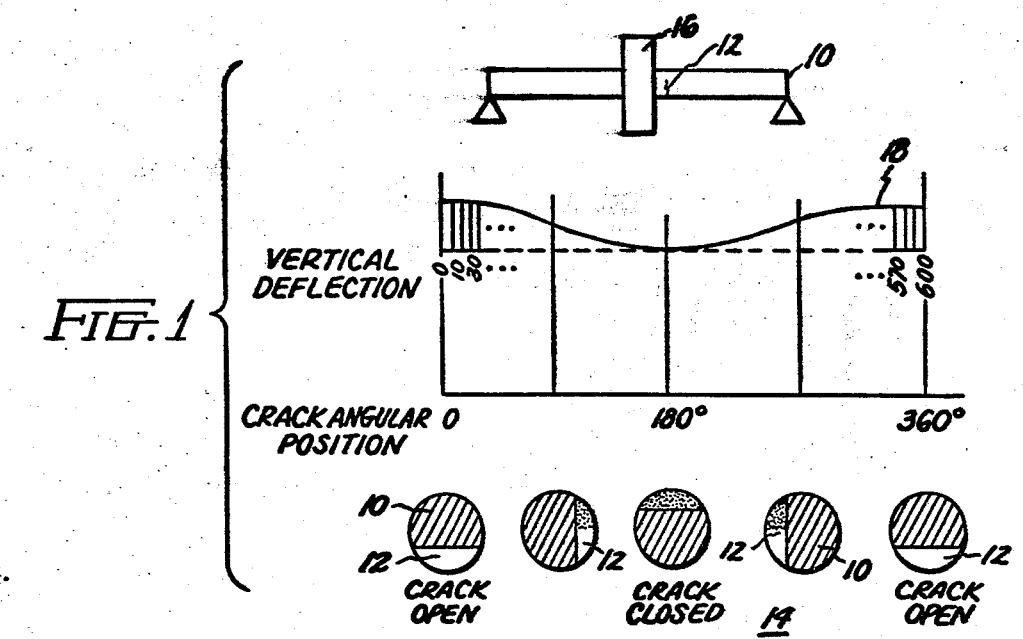
FIG. 1 is a simplified schematic illustration of a turbine-generator rotor showing the opening and closing behavior of a crack in the rotor during one complete revolution and also showing a curve depicting the vertical deflection, at one location of the rotor, due to the presence of such a crack, and also illustrating the division of such a deflection curve into discrete segments for signal summing purposes.

The presence of a crack in the rotor of a turbine-generator (e.g., a large steam turbine-generator) causes the bending stiffness of the rotor to vary with its instantaneous position. In addition, a crack introduces stiffness asymmetry in the vertical and horizontal directions. These effects produce vibration patterns in the rotor which are different from the vibration patterns produced by a normally operating turbine-generator having an uncracked rotor. For example, FIG. 1 schematically illustrates the vertical deflection of a particular axial position of a rotor 10 as a function of the rotor angular position. In FIG. 1, rotor 10 includes a crack 12 which opens and closes depending on the angular position as illustrated by the cross-sectional views of rotor 10 generally shown at 14. A deflection, or vibration, sensor 16 responsive to vertical deflection of the rotor 10 provides the response curve 18 as a function of angular position of the rotor 10.

FIG. 1 will aid in understanding the principles and operation of the invention, and will be referred to in combination with FIG. 2 which schematically illustrates a turbine rotor and one form of apparatus for producing and analyzing vibration signals in accordance with the invention. In FIG. 2, only those elements of a steam turbine essential to an understanding of the invention are shown. It will be recognized, for example, that the rotor 11 is encased within one or more outer shells and includes a plurality of radially extending buckets or blades assembled in axially spaced rings which, with associated stationary nozzle rings, form the different turbine stages. Rotor 11, as illustrated, is comprised of two tandemly coupled rotor wheels, 13 and 15, which carry the turbine buckets as described above. The two sheets 13 and 15 are fastened together through coupling 17 and rotate as a unit while supported by journal bearings 19, 20, 22, and 24 and shaft 26. For explanation purposes, an illustrative crack 25 is included on the surface of rotor wheel 13.

Vibrations in the turbine rotor 11 are detected by vibration sensors 27–34, proximity located in pairs near each journal bearing 19, 20, 22, and 24. The sensors (for example, sensors 27 and 28) are positioned substantially 90° apart around the circumference of the bearing to discern the vertical and horizontal components of vibration. The vibration sensors 27–34, electrically connected to signal conditioner unit 36, provide electronic signals corresponding to the mechanical vibrations of rotor 11 and may, for example, be displacement or accelerometer type devices such are well known in the art. The signal conditioning unit 36 provides excitation to the vibration sensors 27–34 and receives the time-dependent vibration signals from those devices while providing amplification and filteration of the received signals as necessary. The use of multiple sensors 27–34 as illustrated insures a sensitive response to small cracks and aids in determining their location. To correlate the vibratory responses with angular position of the rotor 11, angular velocity information is derived from the combination of toothed wheel 35 mounted on shaft 26, and magnetic pickup 37. A signal conditioner 39 conditions the signal from magnetic pickup 37 so that the angular velocity signal is in form suitable for handling by the microprocessor based signal analyzer 38. The signal from pickup 37, for example, provides a fixed number of pulses per revolution of the rotor 11.

Each conditioned vibration signal (from signal conditioner 36) is presented to a microprocessor-based signal analyzer 38 which processes the signals as will hereinafter be described in order to detect the presence of an incipient crack, such as crack 25 in the rotor 11. The signal analyzer 38 is capable of handling each vibration signal separately, although with high-speed signal processing techniques currently available, each signal is analyzed essentially concurrently and on a virtual real-time basis. The signal analyzer results are displayed on a cathode ray tube (CRT) readout 40 and may be provided in permanent, hard-copy format by graphic recorder 42. A crack alarm 44 (which may be an audio-visual device) is provided to announce the existence of a crack in the rotor 11 should the signal analysis process indicate that one has developed.

Microprocessor-based signal analyzer 38 handles each input vibration signal separately on a near real-time basis. Each signal is broken into time segments corresponding to one revolution of the rotor 11 to provide a signal segment such as the displacement curve 18 of FIG. 1. A relatively large integral number of signal segments is then consecutively collected from each vibration signal (for example, the number collected may be 500) and these are then summed together by superposition to provide an enhanced vibration signal for each input vibration signal. The summing process magnifies (amplifies) the repetitive components of each vibration signal but removes random noise since noise components are substantially to zero. In effect the noise is integrated out.

The summing and superposition process can be accomplished in any number of ways known in the art; however, it is preferable to sample each time segment of each vibration signal at discrete time intervals—i.e., a certain number of degrees apart for each revolution of the rotor 11 in a histogram fashion. An example of the discrete sampling process for one signal segment for one revolution of the rotor is illustrated in FIG. 1 wherein response curve 18 is sampled at 600 separate points as illustrated. The rotor speed signal from magnetic pickup unit 37 and signal conditioner 39 provide the base line information. With all sampled values held in memory, all corresponding points are summed together to create the enhanced vibration signals. In this manner enhanced background and enhanced foreground vibration signals are produced to be used as will hereinafter be described.

At a time when the rotor is known to be free of cracks, an enhanced background vibration signal for each input vibration signal is provided by signal analyzer 38 in the manner just described. These enhanced background vibration signals are stored in the memory of the microprocessor-based analyzer 38 for later recall. Thus, the enhanced background vibration signals contain the vibration pattern inherent in a normal turbine-generator rotor but each will be substantially noise free.

On a continuous basis, enhanced foreground vibration signals are produced in the manner described above but these signals need not be stored. Instead, the enhanced foreground signals are continuously updated by the acquisition of real-time data from the vibration sensors 27-34. For example, most turbine-generators in this country operate at either 3600 rpm or at 1800 rpm (both producing 60 Hz). Thus, to collect a total of 500 signal segments requires less than one-third of a minute; to update continuously requires even less time.

Since the enhanced foreground vibration signals are acquired in substantially real-time, changes in the vibration pattern of rotor 11 which result from the development of a crack will be inherent in these signals. However, it has been found that analysis of these signals alone does not produce the sensitivity necessary for the very early detection of cracks as desired. What has been discovered is that by taking the difference between corresponding enhanced background vibration signals and enhanced foreground vibration signals, and by then performing spectral analysis on the difference signals, their spectral content is indicative of incipient cracks in the rotor. Cracks whose depth is on the order of one percent of the rotor diameter or less are detectable by this method.

The signal processing techniques described above, including the programming of a microprocessor-based signal analyzer such as analyzer 38 of FIG. 2, are readily achievable by those of ordinary skill in the art having knowledge of the procedures herein described.

Additionally, the techniques of spectrum analysis is well-known in the signal processing field and is also often referred to as "signature analysis" or "Fourier Analysis". Briefly described, the signature analysis separates a complex vibration signal into its harmonic constituent frequencies so that the signal can be presented in the frequency domain as opposed to the somewhat more conventional time domain presentation. In the steady state condition, the most important indication of the presence of a crack is given by the initial appearance and/or a steady state increase in signal components at the higher harmonics of the rotor speed. These signal components may at times herein be referred to as 1/rev, 2/rev, 3/rev harmonics and so on. The appearance or increase in the 2/rev harmonic is especially important because it is the key indication of a transverse or circumferential crack extending partially around the rotor. Furthermore, the 2/rev response begins to increase at the instant of crack initiation. In general, harmonics present due to causes other than a cracked rotor are eliminated by the signal subtraction process and any harmonics which may then remain and which are not produced by a crack remain constant with time. On the other hand, harmonics resulting from a crack change in amplitude as the crack propagates.

Figure 3A:
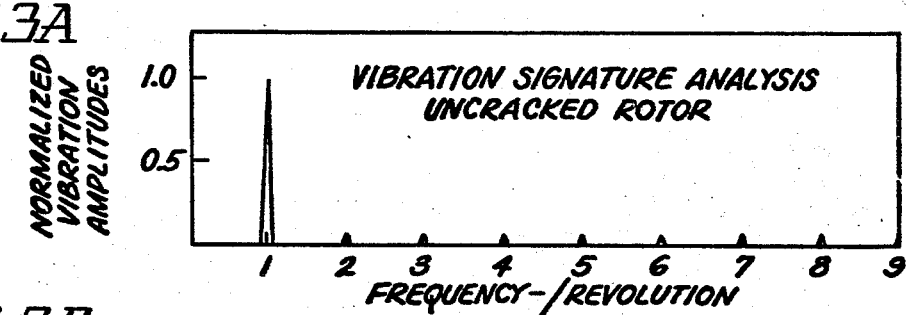
FIG. 3(a) illustrates the results obtained from the signature analysis of vibration signals for an uncracked turbine-generator rotor.
Figure 3B:
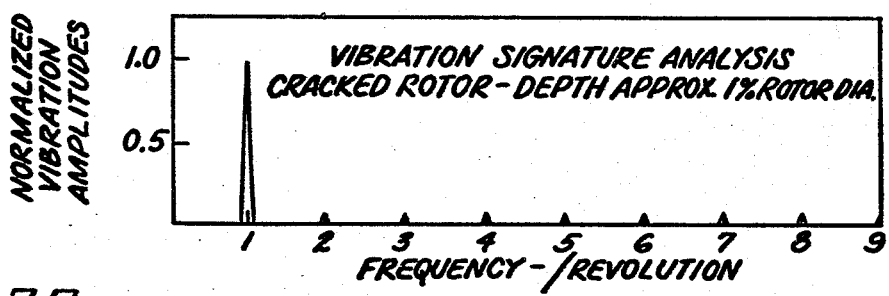
FIG. 3(b) illustrates the results obtained from the signature analysis of a vibration signals for turbine-generator rotor having a crack whose depth is about one percent of the rotor diameter.
Figure 3C:
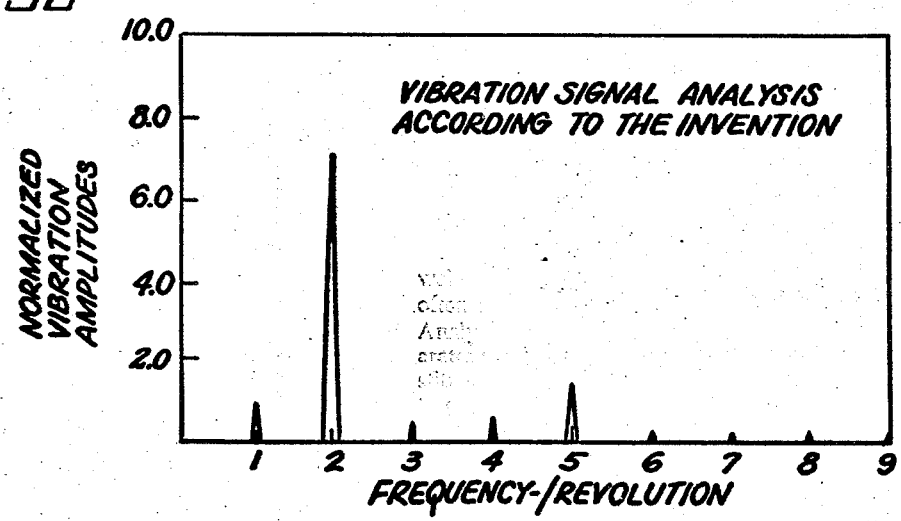
FIG. 3(c) illustrates results obtained from vibration signal analysis according to the present invention and for a turbine-generator rotor having a crack whose depth is about one percent of the rotor diameter.

FIGS. 3(a), 3(b), and 3(c) are frequency domain presentations comparing analytical test results obtained according to the procedure set forth above and analytical test results obtained according to conventional signature analysis, both on a cracked rotor and on an uncracked rotor. For the cracked rotor results of FIGS. 3(b) and 3(c), the depth of the crack is on the order of one percent of the rotor diameter. The horizontal axis of FIGS. 3(a), (b), and (c) is in terms of the fundamental frequency of rotation of the rotor and higher harmonics thereof. Thus, it is notable that the relative response at the 2/rev frequency is predominant in the case of a rotor crack. Nevertheless, there is some increased harmonic response out to at least the ninth harmonic of the speed of rotation. The vibration amplitudes in FIGS. 3(a), 3(b), and 3(c) have been normalized so that the response at the fundamental frequency is equal to 1.0. The presence of an incipient crack in the rotor is deducible, therefore, particularly from the appearance in the frequency domain of second and higher harmonics. The relative amplitudes of the harmonics are determinative of the size of a crack; as a crack grows, the harmonic amplitude of the second harmonic in particular will increase.

The location of a crack in a rotor, such as rotor 11 of FIG. 2, is discernable by comparing the signal analysis results (according to the foregoing procedure) obtained from the various vibration sensors 27-34. Those vibration sensors, of 27-34, nearest the crack will produce highest amplitudes of response. For example, since crack 25 of FIG. 2 is nearest to vibration sensors pairs 29 and 30, analysis of the vibration signals produced by these sensors and according to the invention will produce the strongest 2/rev response.

In FIG. 2, recorder 42 and CRT 40 are provided for presentation of results such as are herein presented in FIG. 3(c). Crack alarm 44 may, for example, be made responsive to the presence of 2/rev components in the difference signals which are greater in amplitude than a preselected value.

While the invention may be practiced in various forms, and which it is intended that only the appended claims shall be limiting, it will be useful to an understanding of the operation and principles of the invention to summarize the signal processing steps performed in a preferred form of the invention. Specifically, the preferred technique is carried out by (a) providing one or more vibration sensors responsive to mechanical vibrations in the rotor being monitored; (b) providing an enhanced background vibration signal for each input vibration signal by superposing and summing an integral number of time segments from each vibration signal—each time segment corresponding one revolution of the rotor; (c) providing a substantially real-time enhanced foreground vibration signal for each input vibration signal in the manner of (b); (d) obtaining a difference signal for corresponding enhanced foreground and background vibration signals by superposing and subtracting the enhanced background vibration signals from corresponding enhanced foreground vibration signals; and finally (e) analyzing each difference signal for spectral content and relative amplitudes of the spectral responses, the appearance and increased response at harmonics of the rotor running speed being indicative of the presence of a crack and of its size.

What is claimed is:

1. A method for detecting incipient cracks in the rotor of a turbine-generator while the turbine-generator is in operation at running speed, comprising the steps of:
   (a) sensing mechanical vibrations of the rotor at at least one location thereof to produce at least one time-dependent vibration signal;
   (b) providing at least one enhanced background vibration signal prior to development of a crack in the rotor, said signal being obtained and processed by
      (b1) collecting an integral number of time segments of said vibration signal, each time segment corresponding to one revolution of the rotor;
      (b2) generating said enhanced background signal by summing together all such collected time segments of said vibration signal by superposing each on the other;
      (b3) storing said enhanced background signal;
   (c) providing at least one enhanced foreground signal by
      (c1) collecting an integral number of time segments of said vibration signal equal to the number collected in (b1), each time segment corresponding to one revolution of the rotor;
      (c2) generating said enhanced foreground signal by summing together all such collected time segments of said vibration signal by superposing each on the other;
   (d) providing a difference signal by subtracting said enhanced background signal from said enhanced foreground signal by superposing one on the other; and
   (e) determining the spectral content of said difference signal, the presence and relative amplitude of higher harmonics of the running speed being indicative of the presence and size of a rotor crack.

2. The method of claim 1 wherein mechanical vibrations are sensed at a plurality of rotor locations to produce a corresponding plurality of vibration signals, and for each such vibration signal;
   an enhanced background signal is provided according to steps (b1) through (b3);
   an enhanced foreground signal is provided according to steps (c1) through (c2);
   a difference signal is provided according to step (d); and
   the spectral content of said difference signal is determined, the presence and relative amplitude of higher harmonics of the running speed being indicative of the presence, size, and location of a rotor crack.

3. The method of claims 1 or 2 wherein the presence in the spectral content of said difference signal of second harmonic frequencies of the running speed at an amplitude greater than a preselected value is determinative of the presence of an incipient crack in the rotor.

4. The method of claim 3 wherein steps (a) and (c) through (e) are continuously repeated to provide continuous detection of incipient cracks in the rotor.

5. The method of claim 3 wherein the presence in the spectral content of said difference signal of second harmonic frequencies which increase in amplitude with time is indicative of the propagation of a crack in the rotor.

6. The method of claim 2 wherein said plurality of vibration signals is provided by vibration sensor pairs, each sensor pair being located proximately to at least one journal bearing of the rotor and disposed to sense vertical and horizontal components of rotor vibrations.

7. The method of claim 4 wherein steps (b) through (e) are performed by a stored-program microprocessor based signal analyzer.

* * * * *